(No Model.) 2 Sheets—Sheet 1.

P. ROBIDEAU.
MACHINE FOR CUTTING BOX SECTIONS.

No. 383,148. Patented May 22, 1888.

Witnesses.
A. Ruppert.
Thomas P. Simpson.

Inventor:
Peter Robideau,
by Clark & Hathaway
Attorneys.

(No Model.) 2 Sheets—Sheet 2.
P. ROBIDEAU.
MACHINE FOR CUTTING BOX SECTIONS.
No. 383,148. Patented May 22, 1888.
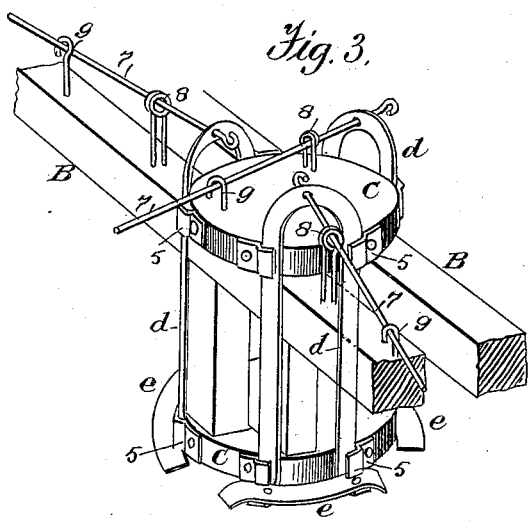
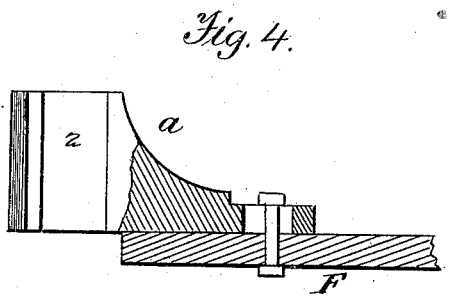
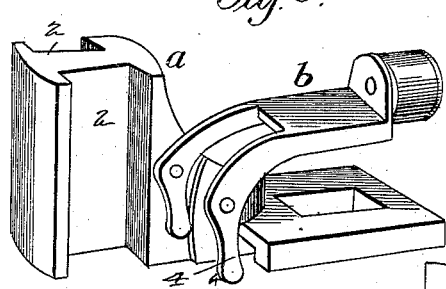
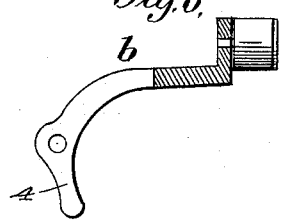
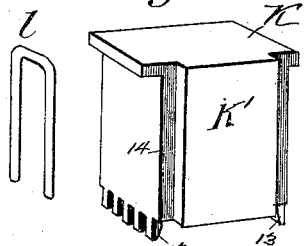
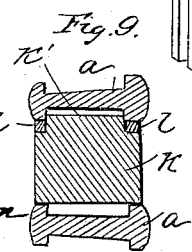
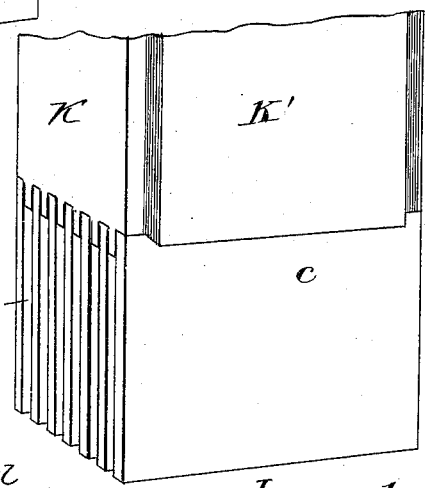
Witnesses.
A. Ruppert
Thomas P. Simpson
Inventor:
Peter Robideau,
by Clark & Hathaway.
Attorneys.
N. PETERS, Photo-Lithographer, Washington, D. C.

UNITED STATES PATENT OFFICE.

PETER ROBIDEAU, OF PLATTSBURG, NEW YORK.

MACHINE FOR CUTTING BOX-SECTIONS.

SPECIFICATION forming part of Letters Patent No. 383,148, dated May 22, 1888.

Application filed June 30, 1887. Serial No. 213,055. (No model.)

*To all whom it may concern:*

Be it known that I, PETER ROBIDEAU, a citizen of the United States, residing at Plattsburg, in the county of Clinton and State of New York, have invented certain new and useful Improvements in Machines for Cutting Box-Sections; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for cutting box-sections; and the object of my improvements is to cut rapidly from prepared grooved blocks of wood sections of different widths for the construction of boxes, the cut sections being all ready for fitting together by mortise-joints to form the boxes without further preparation, the tenons and mortises being made as the sections are cut, by reason of the material having been previously prepared, as stated, by grooving them. I attain this object by the mechanism illustrated in the accompanying drawings, in which—

Figure 1:
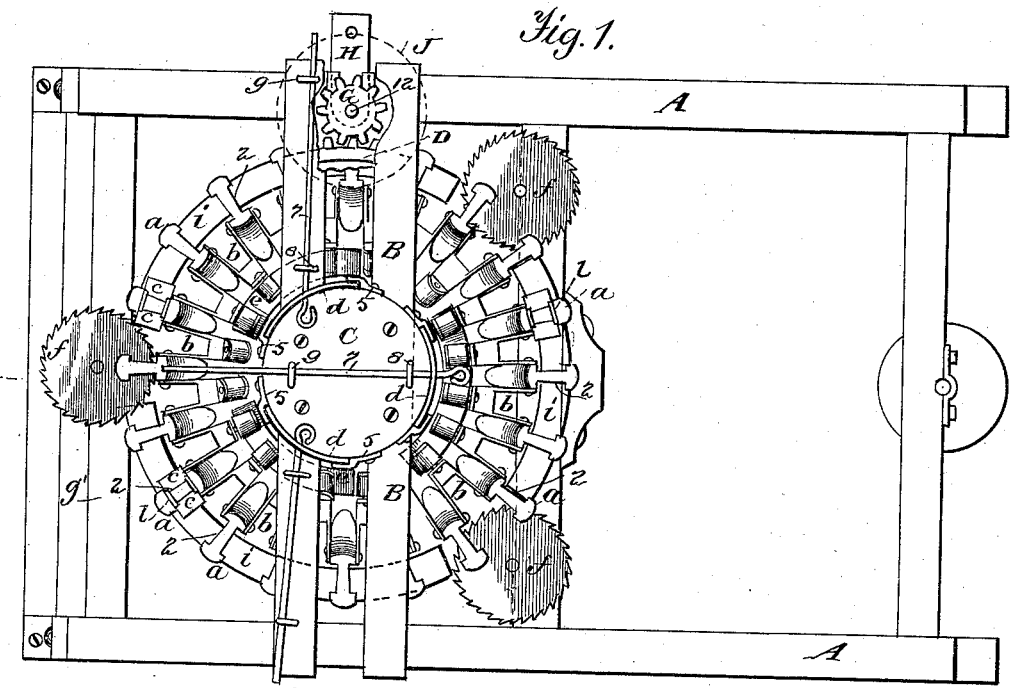
Figure 2:
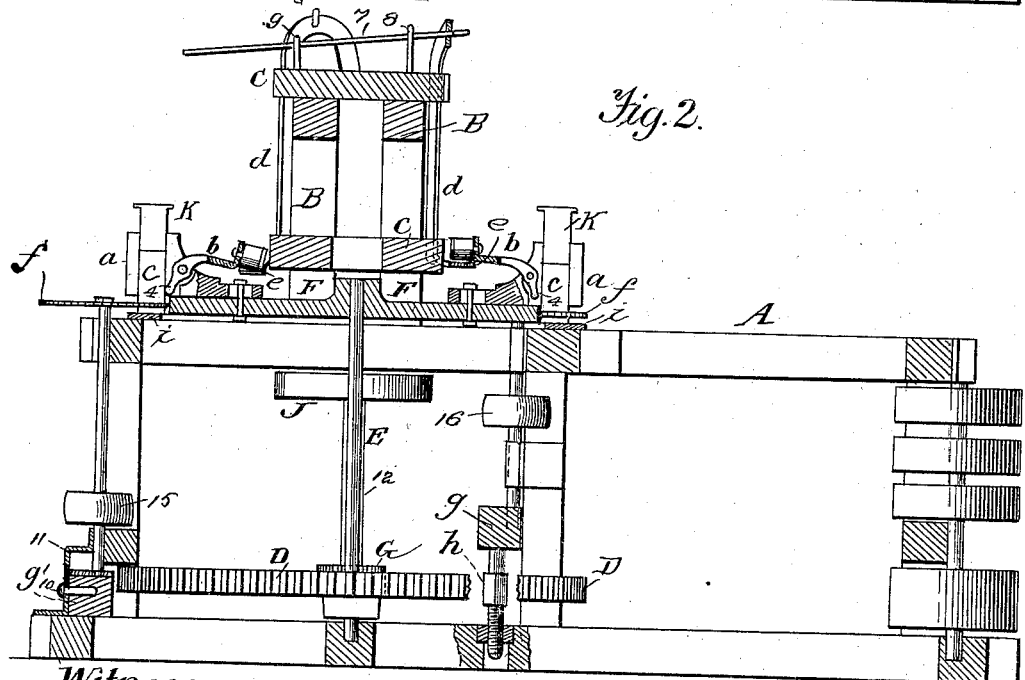

Figure 1 is a plan view of the entire machine. Fig. 2 is a central vertical longitudinal section of the same, some of the parts being shown in side elevation for clearness. Fig. 3 is a detailed view in perspective of the upright frame with the operating mechanism and adjustable dog-plates. Fig. 4 is a detailed view of detached disk and block holders. Fig. 5 is a detailed view in perspective of a block-holder with dog attached. Fig. 6 is a detailed view of dog detached. Fig. 7 is a detailed view of a block-weight. Fig. 8 is a detailed view of wooden block with block-weight attached. Fig. 9 is a horizontal section through two adjoining block-holders with a block in place between them.

Similar letters refer to similar parts throughout the several views.

The frame A and upper frame, B, having circular blocks C C above and below, constitute the frame-work of the machine. Revolving in a socket upon one of the lower cross-pieces of the frame A is an upright shaft, E, upon which is a large cog-wheel, D. Connecting with and operated by the shaft E is a revolving horizontal disk, F, upon the face of which are attached twenty or more block-holders, a a, which are intended for receiving and holding the grooved material or blocks (shown at c, Fig. 8) from which the box-sections are cut, as hereinafter described. These holders are provided with vertical grooves 2 upon either side, adapted to receive the wooden blocks c, the latter being so positioned therein that the grooves 3, Fig. 8, will be vertical. The holders a are so placed that they project beyond the edge of the disk the width of the groove cut upon each side thereof, so that the block of wood held thereby can have movement vertically past the edge of the disk in order to establish a proper feeding movement to the cutting device positioned below. Each block-holder is constructed with a shoulder upon the upper side to receive a pivot upon which the gravity-dog $b\,b$ is supported, upon the upper end of which is a roller. The dogs $b\,b$ are so constructed that when the upper ends are depressed the lower ends are pressed against the blocks of wood, $c\,c$, holding them firmly in place in the grooved block-holders. The lower ends, 4, of the dogs $b$ may be provided with points, as at 6, Fig. 5. When the upper ends of the dogs $b\,b$ are elevated, as hereinafter described, the pressure upon the blocks of wood is relieved, allowing the blocks of wood to slip down in the grooves of the block-holders.

To the upper frame, B, and circular blocks C C are attached, by means of clips 5, double metallic sliding bars $d\,d$, attached to the lower end of which are curved metallic plates $e\,e$, having the ends depressed.

The curved metallic plates $e\,e$ are placed above and horizontally to the revolving disk F at a convenient distance from the edge of the disk, so as to allow the rollers on the upper ends of the dogs $b\,b$ as they revolve with the disk and meet the depressed ends of the curved metallic plates to roll up over them, thereby elevating the upper ends of the dogs, causing their lower ends, 4, to disengage from the blocks of wood, which are then free to move downwardly. Open spaces are left between the curved plates, which cause the upper ends of the dogs $b\,b$ as they revolve to be depressed by their weight, causing the joints in the lower ends to engage and firmly hold the blocks of wood in their places as they come in contact with the saws. To the double sliding bars $d$ $d$ are attached levers 7 on the top of the upper frame, B, by means of which the curved plates $e\ e$ are raised or lowered at will. These levers marked 7 are fulcrumed in supporting-staples 8, and when in normal position may be held by hooks 9, as shown more particularly in Fig. 3.

When it is desired that the block of wood be held above and away from the cutting device positioned beneath, the lever 7 is manipulated to depress the curved plate $e$, which thus allows the roller end of the dog to remain depressed, so that the other end will continue to engage the block and hold it up. Supported in the frame A at desired intervals, and in juxtaposition to the revolving disk F, are circular saws $f f$, which revolve in an opposite direction from the disk F and below the projecting block-holders $a\ a$.

The shafts of the saws $f f$ revolve in sockets upon the sliding cross-bars $g\ g'$, the former of which can be raised or lowered at will by means of the screw $h$, and the latter by adjusting it in its slotted supporting-brackets 11, Fig. 2, by means of the set-screw 10, thus enabling the operator to raise or lower the saws toward or from the projecting block-holders $a\ a$ to regulate the thickness of the cut sections.

For imparting motion to the large gear and thence to the disk F, any convenient mechanism may be employed. I have shown in Figs. 1 and 2 a pinion, G, adapted to engage with the large gear D. This pinion is keyed to a vertical shaft, 12, which receives its motion from a pulley, J, supported thereon. (Shown in dotted lines, Fig. 1, and full lines, Fig. 2.) In order that the pinion G may be disengaged from or engaged with the pinion, as the case may require, I support the lower end of the shaft 12 in a sliding plate, H, Fig. 1. Any suitable lever (not shown) may be employed in connection with this plate to operate it.

As previously intimated, in order that the box-sections having tenons and notches may be properly fitted to each other to form a box, they must be cut with accuracy by feeding them in a certain relation to the saws, and they must be fed positively and without any deviation from the predetermined plan. For accurately feeding the blocks, they are fitted snugly to the block-holders, which, as stated, are formed with plain vertical holding-surfaces, and the blocks, while being held positively by these surfaces against undue movement, are permitted accurate movement downward and are guided properly to the saws by the plain or smooth surfaces of the holder.

To cause the blocks of wood to slide readily in the block-holders $a\ a$, metal block-weights $K\ K$, of suitable size to fit the block-holders, are constructed with beveled teeth 13, Fig. 7, fitting closely the grooves in the blocks of wood. The block-weight is provided with a projecting portion, $K'$, Figs. 7 and 8, which enters the vertical groove in the block-holder, the edges 14 of the weight bearing ordinarily upon the edges of the block-holder. For the purpose of adjusting the position of the weight to suit different thickness of blocks, a double metal bar, $l$, Fig. 8, may be employed, which is placed vertically along the edges of the block-holder, and thus serves as a bearing for the edges 14 of the block-weight. The portion $K'$ is made of sufficient thickness to remain partly in the groove of the block-holder when adjusted.

The bars $l\ l$ merely serve as a sort of wedge to hold the block-weight in place should there be any space between the weight and the side of the holder when the weight is adjusted to proper position over the block—that is, with its teeth engaging with the grooves of said block. When, therefore, a block is being used smaller than the space within the holders, so that its sides do not touch both of the holding-surfaces, the same accurate guiding or feeding can be secured by the use of the toothed block-weight with the bars $l\ l$. These block-weights $K\ K$ are provided with shoulders to prevent dropping through the block-holders.

The manner of using the double bar $l$ in connection with the weight K to adjust its position to suit different sizes of blocks, and to make its teeth register with the grooves in the block while preserving its stability, is shown in Fig. 9.

In operating the machine, blocks of wood previously prepared with grooves on two sides are placed in the block-holders $a\ a$ with the metal block-weights $K\ K$ fitted on the tops, the beveled teeth of the block-weights $K\ K$ corresponding with and fitting closely into the grooves on the sides of the blocks of wood. Motion is imparted by engaging the pinion G with the cog-wheel D by operating the slide H. The power, connecting by means of a belt over the pulley J, causes the disk F, with its block-holders carrying the blocks of wood, to revolve, bringing the blocks of wood in contact with the saws $f f$, propelled by connecting belts and pulleys 15 16. Motion may be transmitted by any suitable belting from the pulleys shown on the right of Fig. 2. The thickness of the box-section sawed from the block of wood is regulated by adjusting the height of the saws $f f$ by means of the sliding bar $g\ g$ and hand-screws $h$. The rollers upon the upper ends of the dogs $b\ b$ rest upon the curved plate $e\ e$, and just before the block of wood in a block-holder reaches the saw the roller on the dog reaches the end of the curved plate $e\ e$, which causes the upper end of the dog to be depressed and the lower end or points thereon to tightly engage the block of wood, holding it firmly in place while the saw $f f$ cuts a slice therefrom of the desired thickness. The roller on the dog $b\ b$, after having passed the saw $f f$, reaches the curved plate $e\ e$, causing the upper end of the dog $b\ b$ to be elevated, releasing its hold upon the block of wood. The block-weight $K\ K$ thereon causes the block of wood to settle in the block-holder *a a*. To prevent the block of wood settling too far, curved metal plates *i i* are placed so as to reach from one saw to the other, the block of wood passing as the disk revolves, and the foregoing operation is repeated as soon as it reaches the next saw, as before stated. Whenever it is desired to have the blocks of wood pass a saw for any reason without coming in contact with the saw, the curved plate *e e* is lowered by means of the lever placed on the top of the upright frame B, which causes the dogs *b b* to hold the block of wood in the position in which it left the last saw, carrying it above the saw. As many of these curved plates *e e* with their operating-levers are provided as there are saws *f f*. The revolutions of the disk F, accompanied by the blocks of wood in the block-holders *a a*, cause a very rapid cutting from the blocks of wood as they are brought into contact with the saws *f f*. The grooves in the sides of the block of wood form the dovetail in the section as it leaves the saw. As soon as the pieces are cut from the blocks they drop down and may be directed into and conveyed away in troughs provided for the purpose.

It will be noticed from the foregoing that by reason of arranging the disk F horizontally and providing vertical holders the movement of the blocks is secured by gravity, and also by this arrangement the dogs may be operated by the action of gravity to engage with the blocks.

What I claim, and desire to be secured by Letters Patent, is—

1. In combination, the revolving disk, the series of independent block-holders carried thereby, formed with plain smooth holding-surfaces for receiving the block and holding it by direct contact, said surfaces being also arranged vertically, whereby the material is guided accurately and permitted vertical movement by gravity, means for limiting the movement of the blocks, and the saws for cutting the material, substantially as described.

2. In combination, the revolving disk F, the series of independent block-holders arranged thereon having vertical plain smooth holding-surfaces to receive the material and engage the same by direct contact and allow its free vertical movement, each holder having a dog for engaging with the block, and the plates *e e*, substantially as described.

3. In combination, the revolving disk, the block-holders, the dogs for engaging with the material, the plates *e e*, for operating the dogs, said plates being movable vertically, whereby they may be rendered ineffective, and holding devices for said plates, substantially as described.

4. In combination, the disk F, the block-holders arranged with vertical holding-surfaces, and suitable block-weights adapted to rest upon the material, substantially as described.

5. In combination, the disk F, the block-holders, suitable block-weights adapted to rest upon the material, and having teeth to engage with the grooves of the material, substantially as described.

6. In combination, the disk F, the grooved block-holder, the block-weights provided with teeth, and with portions K', adapted to the grooves of the holders, and the double bars *l l*, for adjusting the weights, substantially as described.

In testimony whereof I affix my signature in presence of two witnesses.

PETER ROBIDEAU.

Witnesses:
WILLIS L. WEVER,
HENRY H. PARMERTER.